INVENTOR.
Walter Drabik
BY
Robert W Smith
ATTORNEY

United States Patent Office 3,445,706
Patented May 20, 1969

3,445,706
DYNAMOELECTRIC MACHINE COIL
SPACER AND SUPPORT
Walter Drabik, Downers Grove, Ill., assignor to General
Motors Corporation, Detroit, Mich., a corporation of
Delaware
Filed Feb. 20, 1967, Ser. No. 617,115
Int. Cl. H02k 3/48
U.S. Cl. 310—270    5 Claims

ABSTRACT OF THE DISCLOSURE

In a preferred embodiment a dynamoelectric winding coil end support and spacer has upper and lower angularly displaced flat spacing portions that are positioned between individual coil conductors of adjacent coil layers. With individual spacers associated with the coil ends, the spacers and the multiple coil ends are mutually interlocked in spaced apart and supporting relationship.

---

The field of this invention is directed to dynamoelectric machines having coil windings formed with exposed coil ends which are wound in place with a spacing and end support means. In the prior art wooden blocks are fitted between the winding end portions after the conductors of a dynamoelectric machine are placed in core slots. The blocks are inserted and individually fitted and then tied in place by means of a cord or wrapping. The coil ends must be spaced and supported since machine vibrations cause abrasion and breakdown of the conductor insulation. Also, to provide heat dissipation the coil ends are required to be spaced to permit air circulation.

This invention relates to a coil end support and spacer means for windings of a dynamoelectric machine including integral flat spacer portions disposed in separate horizontal planes while intersecting to form an angle corresponding to the angle formed by the conductors at the winding coil end portion and adapted to be placed between laterally adjacent conductors of at least two coil layers to interlock and properly space the coil end portions of the dynamoelectric machine windings.

The coil end support and spacer means of this invention is inserted between the conductors as the winding layers are placed in the slots of an armature core. The spacer may be manufactured as a molded article having flat spacer portions formed at an angle corresponding to the angle formed by the conductors at the coil end thereby spacing the conductors at the proper winding angles. Since the coil ends are interlocked between layers there is no longer required any long and tedious tying operations while still providing the coil ends with a secured support feature.

Accordingly, one object of this invention is to provide an improved coil end support and spacer means for a dynamoelectric machine separating the conductors in fixed relationship while simultaneously increasing the strength and rigidity of the coil ends by mutually interlocking the winding conductors.

Another object of this invention is to provide an improved coil end support and spacer means for a dynamoelectric machine that is formed by a simple one piece article of insulating material having intersecting side spacer portions easily mounted in place between adjacent conductors and separate winding layers forming an integral interlocking and self supporting coil end arrangement.

Further objects and advantages of the present invention will be apparent from the following description reference being had to the accompanying drawings wherein preferred emobidemnts of the present invention are clearly shown.

Figure 1:
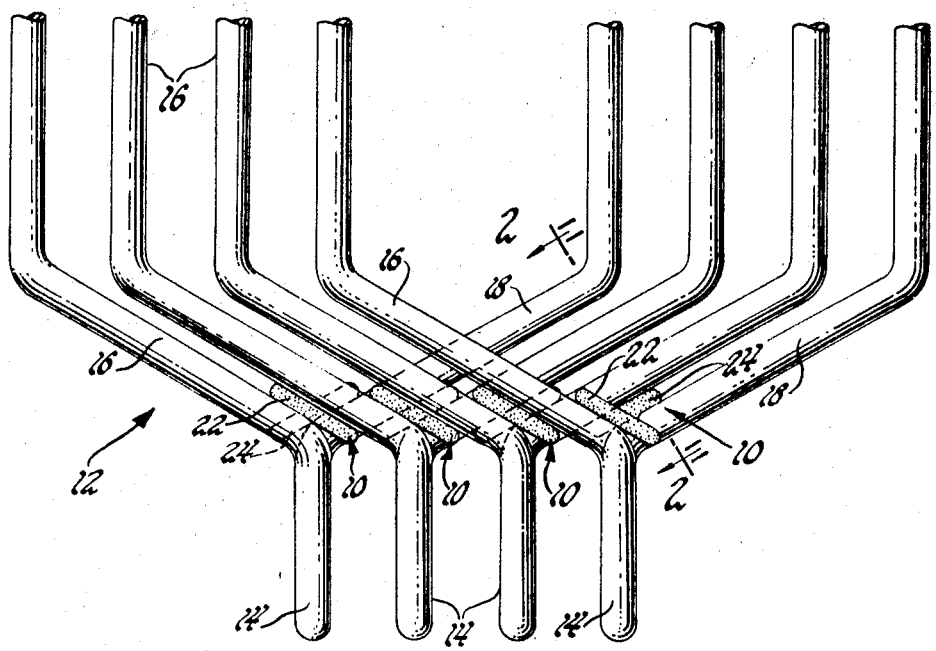
FIGURE 1 illustrates a top view of coil ends of a dynamoelectric winding assembly with the coil support and spacer means of this invention placed in locking positions.
Figure 2:
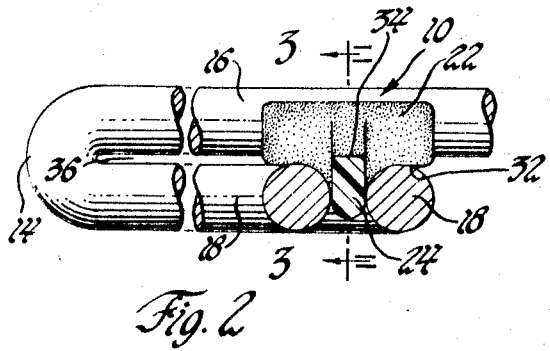
FIGURE 2 is a cross-sectional view taken along line 2—2 of FIGURE 1.
Figure 3:
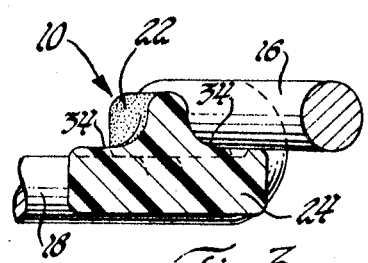
FIGURE 3 is a cross-sectional view taken along line 3—3 of FIGURE 2.

Referring now to the drawing wherein like reference caracters designate like or corresponding parts throughout the several views, there is shown in FIGURES 1 through 3 the coil end support and spacer means 10 of this invention placed between winding conductors. FIGURE 1 illustrates a top view of the end portions of coil windings 12 of a dynamoelectric machine, not shown. The coils of the windings 12 are formed as conventional diamond-saped coils which are widely used particularly when all of the coil conductors are of the same size. The coil end support and spacer means of this invention is especially useful in supporting end portions of the diamond-shaped coils. Normally, the end portions extend beyond the ends of the machine core in an overhanging relationship. Among other advantages, the diamond-shaped coil configuration permits good bracing of end connections.

The overhanging end portions of the diamond-shaped coils include end turns 14, a side view of which is illustrated in FIGURE 2. The end turns are formed when the coil windings are formed prior to being placed in core solts of a dynamoelectric machine. Accordingly, an upper layer of conductors 16 and a lower layer of conductors 18 are formed when the conductor is doubled back on itself at an end turn 14. The distribution of the conductors in the machine core slots determines the angle formed in a single turn between an upper layer conductor 16 and a lower layer conductor 18. The path of a single turn includes one conductor projecting from a slot while the other conductor is returning toward a slot as the coil windings are respectively placed in the core slots.

Figure 4:
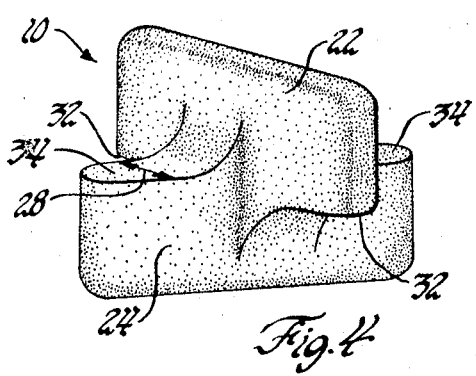
FIGURE 4 is a perspective view of the coil support and spacer means of this invention.

Coil support and spacer means 10 is clearly shown in the perspective view of FIGURE 4 which illustrates mutually transverse upper and lower spacing portions 22 and 24, respectively. Each of the spacing portions 22 and 24 are generally rectangular being defined by opposed substantially flat sides separated by a predetermined width 28. The width 28 is determined by the spaciing required between conductors. The coil support and spacer means is preferably made of a moldable insulating material such as plastic and Bakelite compositions. The upper spacing portion 22 and lower spacing portion 24 extend in separate horizontal planes and are interconnected along a central portion at the bottom of spacing portion 22 and the top of spacing portion 24. The exposed lower extending edge surface 32 of the upper portion 22 and the upper extending edge surface 34 of the lower portion 24 provide conductor engaging surfaces which are illustrated in FIGURES 2 and 3. With the edge 32 lower than the edge 34, the upper and lower conductors are spaced apart as indicated at 36. Preferably, the heights of the substantially identical portions 22 and 24 are each not more than the thickness of the winding conductors. If the windings are wound in multiple layers and the conductors are stacked above one another, the height of support and spacer means 10 should not extend above the conductor sides.

The angle between the sides of the upper and lower spacing portions 22 and 24 is equal to the angle between the lower conductor layer and upper conductor layer of a single end turn. The support and spacer means 10 may be positioned at a location other than at the corner portion of an end turn which is shown in FIGURE 1.

In practice there may be a number of layers of winding coils above and below those shown in the arrangement of FIGURE 1. As the windings are placed in the respective core slots the coil support and spacer means 10 will be placed so as to separate two adjacent lower layer conductors 18. The support and spacer means 10 can be positioned at the inside corner of an end turn 14 which is formed where projecting and returning conductor portions diverge. The spacer means 10 may be alternately placed circumferentially so that the upper spacing portion 22 and lower spacing portion 24 are alternately spacing lateral conductors of a common layer so that all layers of a winding arrangement will be interlocked.

It can be observed that a pair of upper layer conductors 16 will be supported by the edge surface 34 of a lower spacing portion 24. The same portion 24 is separating two associated lower layer conductors 18 which engage opposite sides of the lower edge 32. The conductor engaging surface 32 of the support and spacer means 10 will engage two separate lower layer conductors and edge surface 34 engages separate upper conductors 16. Obviously since the windings are circumferentially placed around a conventional circular stator core member, the upper and lower spacing portions 22 and 24 and upper and lower conductor layers 16 and 18 will be reversed relative to the top and the bottom of the winding arrangement. The designation of upper and lower parts is used only to distinguish the respective parts referred to.

It is apparent that the support and spacer means 10 may be used with a wound coil of either a rotor or stator of a dynamoelectric machine without departing from the scope of this invention.

While the embodiment of the present invention as herein disclosed constitutes a preferred form, it is understood that other forms may be adopted that are within the scope of the appended claims.

I claim:

1. A coil end support and spacer for coil windings having coil ends disposed in layers comprising: a first planar portion and an integral second planar portion; said first and second planar portions each including substantially flat parallel sides separated by a predetermined width; said first planar portion being angularly connected with said second planar portion about a common central portion between said first planar portion and said second planar portion with said sides of one planar portion extending transversely to the sides of the other planar portion; said second planar portion including exposed edge surfaces adapted to engage a pair of coil conductor ends when the conductor ends are spaced apart along said sides of said first planar portion.

2. A coil end support and spacer means for coil windings of a dynamoelectric machine having exposed coil ends disposed in layers comprising: integral first and second flat spacer portions having parallel side surfaces angularly disposed about a connecting portion intermediate said first and second spacer portions; said parallel side surfaces of said first spacer portion extending at a predetermined angle to the side surfaces of said second spacer portion to form flat edge portions extending from said connecting portion; said spacer portions adapted to provide predetermined separations between adjacent coil conductors in a common coil layer when either of said spacer portions is positioned therebetween; and said edge portions of one of said spacer portions adapted for engaging separate conductors laying in a common layer when the separate conductors are space dapart by said side surfaces of the other of said spacer portions to additionally secure siad support and spacer means in place.

3. A coil end support and spacer means for end turn portions of diamond-shaped coil windings of a dynamoelectric machine comprising: first and second flat and substantially rectangularly shaped spacer portions formed as a single article of insulating material, said first and second spacer portions each having side surfaces extending at an angle with the side surfaces of the other spacer portion; said angle being substantially equal to the angle between the conductors at each end turn of a diamond-shaped coil; and said first and second spacer portions disposed in upper and lower relationship to provide spacing between laterally adjacent conductors in each of two separate conductor layers formed by said diamond-shaped coil windings.

4. A coil end support and spacer means for a dynamoelectric machine including a coil winding arrangement having several layers of end turns overhanging the dynamoelectric machine core comprising: plural spacing members of molded insulation material capable of being individually disposed within said arrangement; each spacing member including angularly interconnected first and second flat portions including side surfaces separated by a predetremined width for separating adjacent coil conductors; said first and second flat portions being angularly disposed in separately spaced planes such that said first and second flat portions extend along transverse planes intersecting at the interconnection of said first and second flat portions for positioning each flat portion between each layer of consecutively disposed upper and lower layers of coil end turns; each coil end turn having two conductors formed at an angle between the conductors corresponding to the angle provided between said side surfaces of said first and second flat portions; said plural spacing members thereby providing means for interlocking the coil end portions of the several winding layers by overlapping conductors which lay in consecutive layers.

5. In a dynamoelectric machine: a core member having a plurality of winding layers disposed in slots in said core member, said winding layers including diamond-shaped end turn portions extending beyond the core member ends, a coil end support and spacer means including a plurality of separate insulating spacing members inserted between conductors of the end turn portions about the circumference of said winding layers, each of said spacing members including first and second angularly disposed flat spacer portions; said first flat spacer portion having parallel side surfaces extending between adjacent conductors of one winding layer and said second flat spacer portion having parallel side surfaces extending between adjacent conductors of another winding layer; the conductors forming each end turn portion having an angle formed therebetween corresponding to an angle between said first and second spacer portions; said first spacer portion further including edge surfaces extending from both sides of said second spacer portion and engaging the outer sides of said adjacent conductors which are spaced apart by said second spacer portion; said second spacer portion including edge surfaces extending from both sides of said first spacer portion in a plane substantially parallel and spaced apart from the plane including said edge surfaces of said first spacer portion; said edge surfaces of said second spacer portion engaging the inner sides of said adjacent conductors which are spaced apart by said first spacer portion whereby said adjacent conductors of said one layer are held in spaced relationship to said adjacent conductors of the other layer.

(References on following page)

References Cited

UNITED STATES PATENTS

| | | | |
|---|---|---|---|
| 2,980,757 | 3/1961 | Coggeshall | 310—270 |
| 3,075,112 | 1/1963 | Andersen | 310—270 |
| 3,089,048 | 5/1963 | Bahn | 310—270 |
| 3,192,423 | 6/1965 | Pearson | 310—270 |
| 3,365,600 | 1/1968 | Penn | 310—270 |

FOREIGN PATENTS 852,676  10/1960  Great Britain.

MILTON O. HIRSHFIELD, *Primary Examiner.*

A. G. COLLINS, *Assistant Examiner.*

U.S. Cl. X.R.

310—65; 174—147, 174; 336—207